Figure 1:
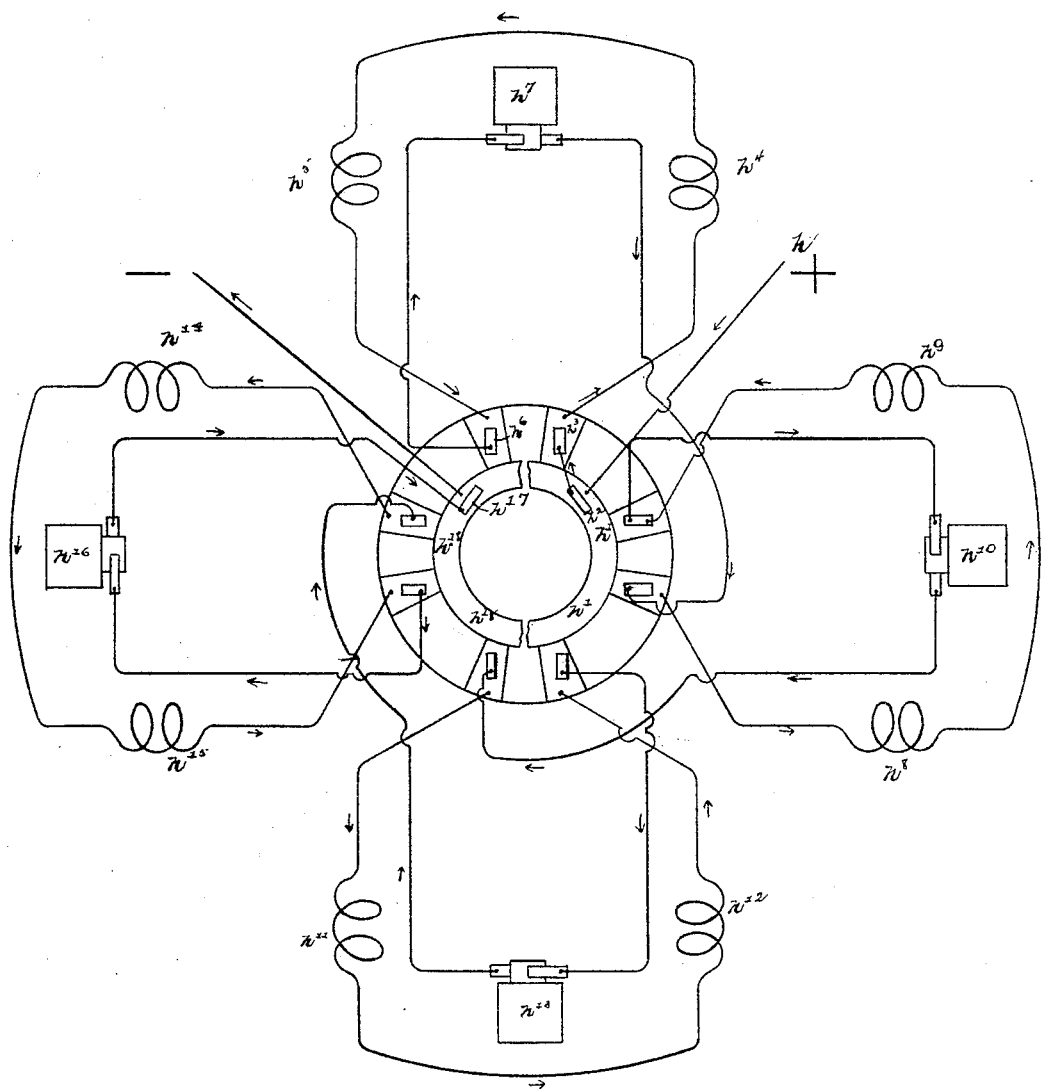

(No Model.)  3 Sheets—Sheet 1.
A. B. RONEY.
ELECTRIC MOTOR.

No. 454,627.  Patented June 23, 1891.

Witnesses
George L. Bagg.
Walter Thompson

Inventor,
Alexander B. Roney
By George H. Barton
Atty.

(No Model.) A. B. RONEY. 3 Sheets—Sheet 3.
ELECTRIC MOTOR.

No. 454,627. Patented June 23, 1891.

Witnesses:
George L. Hay
Walter Thompson

Inventor,
Alexander B. Roney.
By George P. Barton
atty

UNITED STATES PATENT OFFICE.

ALEXANDER B. RONEY, OF CHICAGO, ILLINOIS.

ELECTRIC MOTOR.

SPECIFICATION forming part of Letters Patent No. 454,627, dated June 23, 1891.

Application filed January 3, 1891. Serial No. 376,572. (No model.)

*To all whom it may concern:*

Be it known that I, ALEXANDER B. RONEY, a citizen of the United States, residing at Chicago, in the county of Cook and State of Illinois, have invented a certain new and useful Improvement in Electric Motors, (Case 1,) of which the following is a full, clear, concise, and exact description, reference being had to the accompanying drawings, forming a part of this specification.

My invention relates to electric motors; and its objects are, first, to maintain the unit of power derived from a high-speed armature, while the high speed of the armature is transformed into a slower-speed power, this being accomplished without loss of unit power; second, by providing adjustable motors upon the arms which extend radially from the working-shaft I am enabled to further augment the ultimate amount of power by adding the principle of fulcrum leverage; third, by providing means under the control of the operator for changing the position of the motors upon the arms carrying the same the speed of the working-shaft may be changed to rotate either faster or slower without checking the current; fourth, by providing special field-magnets in connection with the motors which are carried upon the radially-extended arms and arranging the circuits in series I am enabled to obtain the greatest efficiency from a given current, and, fifth, by placing the electric motors carried upon the radial arms between the faces of the field-magnet and providing wheels upon these motor-armatures adapted to press against one of the faces the speed of the working-shaft may be varied by adjustment of the armatures outwardly or inwardly upon the arms, the fulcrum leverage being changed at the same time. I preferably provide four radial arms set perpendicular to the driving-shaft, these arms being equally spaced and in the same plane. Each of these arms is provided with a separate motor, the armature thereof being free to revolve upon the same, and by means of a system of levers adapted to be worked together these motor-armatures may be adjusted upon the shafts carrying the same either outwardly or inwardly. I preferably provide a system of compound levers, which may be connected with a collar loose upon the main shaft and adapted to be moved by any suitable means, as by a lever fulcrumed to the machine, and having its end resting in a groove about the circumference of the collar. By lateral movement of this ring along the main shaft the armatures of the motors may be moved outwardly or inwardly by the action of the levers connected between the said collar and the armatures. The field-magnets consist of a series of wedge-shaped pieces with coils wound thereon, placed radially about a common center. The terminals of the field-coils are connected to the field-commutators, which have as many divisions as there are coils, the commutators being placed near the common center. There is yet within and closer to the shaft and fastened to the frame a ring, which I call the "collecting-ring." A double set of field-magnets should be provided, and when connected together by means of yokes, as will be more fully explained, may be considered as constituting, as it were, a horseshoe-magnet. Suitable brushes are provided upon the field-magnet for the field-magnet commutators. Each of the motor-armatures has its own commutator and brushes, and these are connected up electrically with the field-magnet brushes. The main shaft should be turned down true, as well as the radial arms, which are inserted in the shaft at right angles thereto and in a true plane with one another and in sympathy with the faces of the field-magnets. The motors mounted upon these arms may be of any type; but I have used armatures of the Gramme-ring pattern. These armatures are, as before stated, fastened to the collar upon the main shaft, which is common to all of them, through the system of compound levers. The field-magnet brushes should be last placed in position and then wired, so as to put each set in series with itself and the combined set in series as a whole. The frame to which the magnets are fastened is preferably made of wood. The coils of the magnets, which may be considered as segments of a circle, are fixed radially around the common center and at such a distance from the center as to admit the field-commutator, and still farther in is fixed the collecting-ring, and centrally should be placed the journal-bearings of the main shaft. The different parts of the field-magnet should be placed in a lathe and faced down flat and the journal-bearing bored out, the commutator and collecting-ring being trued up before removing from the lathe. The main shaft is now inserted into the journal-bearings. We now have the two circular parts of the field-magnet placed opposite one another, with their faces presented to the motors upon the arms inclosed between the same. These parts are adjusted quite near to the motors, preferably so as to nearly touch the wheels provided upon the motor-armatures. When thus placed close enough to just allow these wheels to be turned without touching either face, the two parts of the field-magnet are secured together by the yokes. The top terminal wires of the field-magnet coils are connected together around the yokes. The main shaft is drawn lengthwise through its bearing, so as to bring the wheels upon the motor-armatures against one of the faces of the field-magnet, and by means of a coiled spring or other suitable device provided upon the shaft the shaft is held in position, so as to cause the wheels to always press against one of the faces. When the supply-conductors are connected to the collecting-rings and the current turned on, the operator, by means of a lever controlling the compound levers, moves the motor-armatures outwardly, so as to be between the outer portions of the field-magnet. The armatures will in this position, when rotating between the faces of the field-magnet, drive the main shaft slower; but on bringing the armatures inwardly the circumference of the circle described by the armatures will be diminished, and hence the working-shaft will be driven with corresponding increased speed—that is to say, the closer the armatures upon the radial arms are to the center the greater will be the speed and the farther away from the center the slower will be the speed, while the leverage will be greater.

My invention will be more readily understood by reference to the accompanying drawings, in which—

Figure 2:
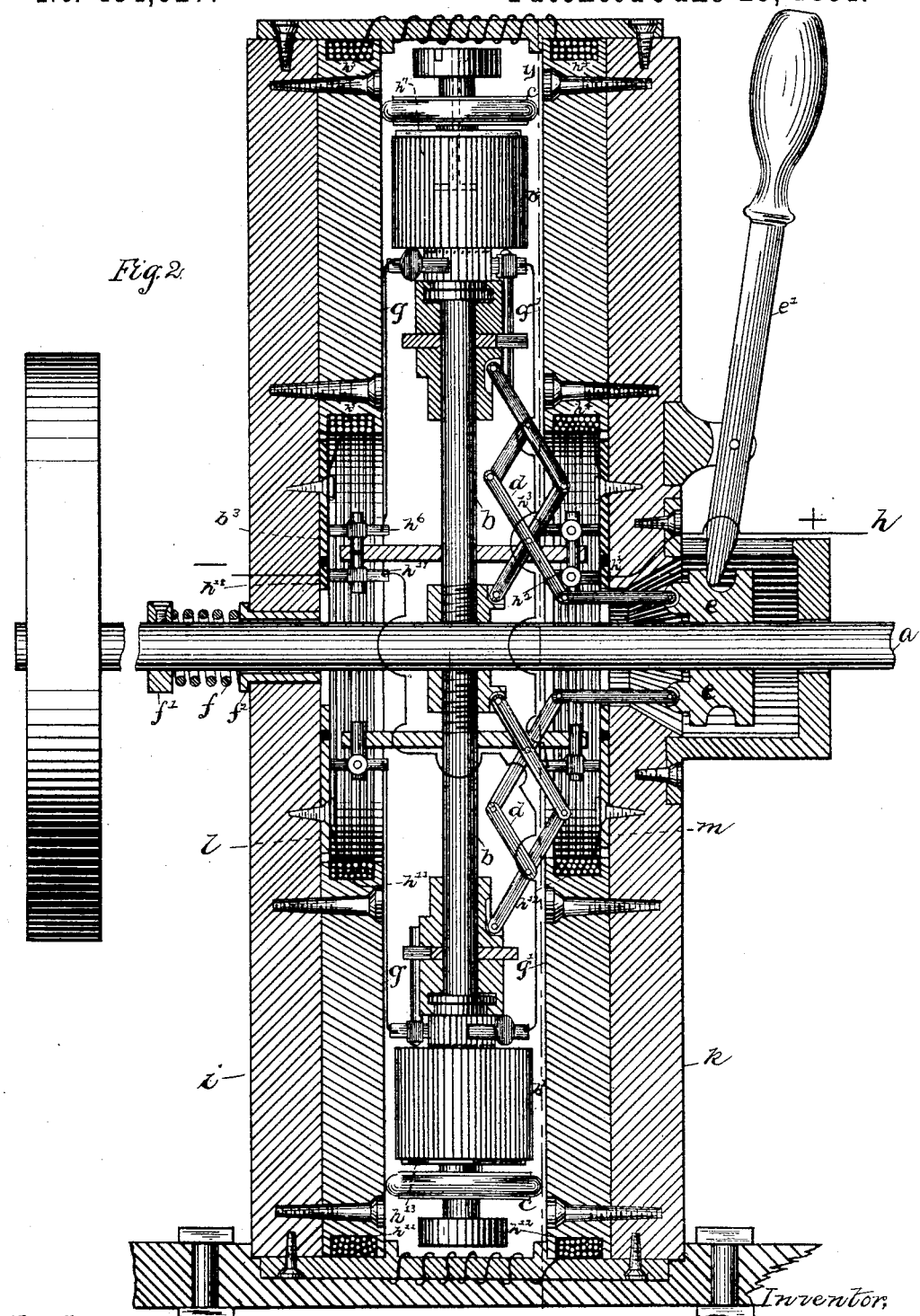
Figure 3:
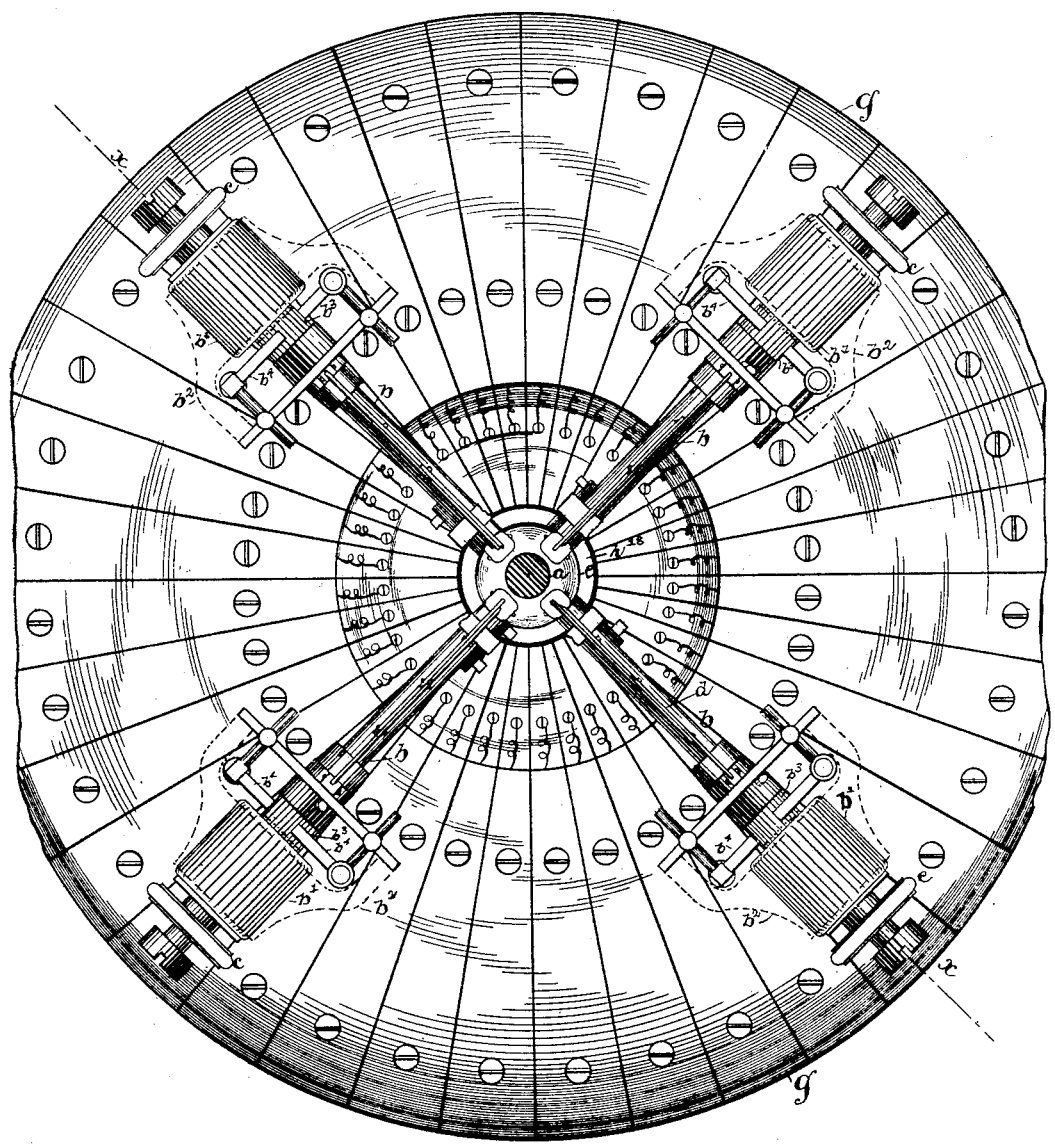

Figure 1 is a diagram illustrative of the circuits of my motor. Fig. 2 is a sectional view upon line $xx$ of Fig. 3, showing the position of the field with respect to the motors, the motors being placed upon radial arms rigidly connected in the same plane with the working-shaft and means provided for adjusting the motors outwardly or inwardly upon said arms. Fig. 3 is a view of the motors upon the arms in connection with the face of the field about which they are adapted to travel, as seen from section-line $y\,y$ of Fig. 2.

Like parts are indicated by similar letters of reference throughout the different figures.

The main or working shaft $a$ is driven by means of the power transmitted thereto from the arms $b\,b\,b\,b$. These arms are rigidly connected with the shaft $a$ and are placed in the same plane. Upon each of these arms is provided an electric motor, which may consist of an ordinary motor-armature $b'$, a motor-field $b^2$, the commutator $b^3$, and the brushes $b^4$.

In Fig. 2 I have omitted the motor-field $b^2$, the same being simply indicated by dotted lines in Fig. 3. As a special feature of these separate motors upon the different arms it should be observed that each is provided with a wheel $c$, which should be of insulating material, preferably rubber. Moreover, these separate motors are connected by levers $d$ with a common piece or collar $e$, which is adapted to be moved upon the main shaft $a$ by means of a hand-lever $e'$ or otherwise. It should be observed that this collar $e$ is provided with a groove, in which the end of lever $e'$ rests. By forcing hand-lever $e'$ outwardly, as shown, the collar $e$ is forced inwardly upon shaft $a$, and the levers $d$ of the different motor-armatures will be extended to carry the said motors outwardly to the extreme ends of the arms $b$. A spring $f$, placed upon the shaft $a$ between collar $f'$ and the journal-bearing $f^2$, serves to hold the wheels $c$ pressed against the face $g$ of the main face-plate. If these wheels $c$ should be lifted from off the face-plate by moving the main shaft against the force of spring $f$, the main shaft will be carried around at a high rate of speed. This action results from the position of the face-plate coils with respect to the auxiliary motors, which are thus caused to exert a pull upon the energized fields of said auxiliary motors. The direction of this pull may be adjusted and controlled by adjustment of the face-plate brushes. Thus no matter what may be the position of the motors upon the radial arms the wheels $c$ will always be pressed against the face $g$, so that they will be caused to travel over the same, thereby rotating the shaft $a$.

When my motor is used for traction purposes, I provide for reversing the direction of the working-shaft. This is accomplished by simply adjusting the auxiliary motors, so that the wheels $c$ will press against the opposite face-plate $g'$, the face-plate brushes being of course adjusted accordingly.

As shown in Figs. 1 and 2, the supply-conductor $h$ is connected with a collecting-ring $h'$, and thence through the brushes $h^2\,h^3$ to the field-commutator, and thence through coils $h^4\,h^5$ of the field-armature, as indicated by the arrows, to the commutator and brush $h^6$, and thence through the brushes of the motor $h^7$, and so on through field-coils $h^8\,h^9$ and motor $h^{10}$, and thence through the field-coils $h^{11}\,h^{12}$ and the motor $h^{13}$, and thence through field-coils $h^{14}\,h^{15}$ and motor $h^{16}$, and thence to the brush $h^{17}$ to the other collecting-ring $h^{18}$, and thence out. Thus we have the coils of the main field-magnet and the brushes of the motors upon the radial arms all connected up in series.

I have sometimes termed the motors upon the radial arms the "auxiliary motors," since each is in itself a complete motor and adapted to be driven when current is passed through the same. These auxiliary motors are, however, simply a part of the means for driving the main or working shaft $a$, and therefore, speaking generally, I call the entire machine an "electric motor."

As shown most clearly in Figs. 2 and 3, the different coils or segments of the main field-magnet are bolted to wooden frames $i$ $k$. The commutators $l\ m$ of each part of the field-magnet should be secured in like manner to the wooden frame of the part to which it belongs. I preferably arrange the field-coils as shown, so that the auxiliary motors shall be included between the faces. Such an arrangement, however, is not essential to my invention. By this construction, however, the auxiliary motors are inclosed, so as to be protected from external injury, while all the parts of the machine are arranged in a compact and symmetrical manner. Any number of arms from one to a dozen, each provided with an auxiliary motor, might be employed.

The high speed at which a motor should be run is too high for the purposes to which motors are applied. By my invention, however, this high-speed power is changed without loss of energy to such rate of lower-speed power as may be desired, the high speed being utilized to give a greater power in more time.

Having thus described my invention, I claim as new and desire to secure by Letters Patent—

1. In an electric motor, the combination, with the main shaft, of two or more radial arms, each provided with an auxiliary motor connected therewith, said auxiliary motors being provided with wheels adapted to travel about the face of the main field-magnet, said auxiliary motors being adjustable outwardly and inwardly upon said radial arms, substantially as and for the purpose specified.

2. The combination, with the main shaft, of radial arms in a plane at right angles to said shaft, rigidly connected thereto, auxiliary motors, one upon each of said arms, and lever mechanism for at the same time adjusting all of said auxiliary motors outwardly or inwardly upon said arms, substantially as and for the purpose specified.

3. The main shaft $a$, provided with arms $b$, equally spaced in a plane at right angles to said shaft, an electric motor upon each of said arms, a field-magnet exerting a pull upon the energized fields of said auxiliary motors, and means for holding wheel $c$ upon said motors in rolling frictional engagement with face $g$, substantially as and for the purpose specified.

4. The combination, with an electric motor, of two or more auxiliary motors having their armatures upon arms at right angles to the main shaft and adapted to travel around the plane of a circle, said circle being concentric with the axis of the main shaft.

5. An electric motor having one or more auxiliary motors rotating radially around the common axis, in combination with means for adjusting said auxiliary motors from the center to change the speed of the main shaft, substantially as described.

6. The combination, with the working-shaft, of one or more radial arms, each arm being provided with a motor, a face-plate about which the motor or motors are adapted to be driven, and means for radially adjusting the motor or motors, whereby the high speed of the motor or motors may be transformed into such lower rate of speed as may be desired without loss of energy, substantially as and for the purpose specified.

In witness whereof I hereunto subscribe my name this 30th day of December, A. D. 1890.

ALEXANDER B. RONEY.

Witnesses:
GEORGE P. BARTON,
GEORGE L. CRAGG.